United States Patent
Bulea

(10) Patent No.: US 9,052,782 B2
(45) Date of Patent: Jun. 9, 2015

(54) SYSTEMS AND METHODS FOR VOLTAGE GRADIENT SENSOR DEVICES

(75) Inventor: Mihai Bulea, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 769 days.

(21) Appl. No.: 13/194,471

(22) Filed: Jul. 29, 2011

(65) Prior Publication Data

US 2013/0030740 A1  Jan. 31, 2013

(51) Int. Cl.
*G06F 3/044* (2006.01)
*G06F 3/047* (2006.01)
*G06F 3/041* (2006.01)

(52) U.S. Cl.
CPC .............. *G06F 3/044* (2013.01); *G06F 3/0416* (2013.01); *G06F 2203/04108* (2013.01)

(58) Field of Classification Search
CPC ..... G06F 3/044; G06F 3/0416; G06F 3/0418; G06F 3/047; G06F 2203/04108; G06F 2203/04112
USPC .......................... 702/64, 65, 94, 150; 700/302; 178/18.03, 18.05, 18.06
See application file for complete search history.

(56) References Cited

U.S. PATENT DOCUMENTS

| | | | |
|---|---|---|---|
| 4,087,625 A * | 5/1978 | Dym et al. ................. | 178/18.06 |
| 5,650,597 A | 7/1997 | Redmayne | |
| 5,841,078 A | 11/1998 | Miller et al. | |
| 6,278,444 B1 | 8/2001 | Wilson et al. | |
| 6,288,707 B1 | 9/2001 | Philipp | |
| 6,879,930 B2 | 4/2005 | Sinclair et al. | |
| 7,030,860 B1 | 4/2006 | Hsu et al. | |
| 7,355,592 B2 | 4/2008 | Hong et al. | |
| 7,382,139 B2 | 6/2008 | Mackey | |
| 7,423,635 B2 | 9/2008 | Taylor et al. | |
| 7,737,953 B2 | 6/2010 | Mackey | |
| 7,808,255 B2 | 10/2010 | Hristov et al. | |
| 8,248,383 B2 | 8/2012 | Dews et al. | |
| 2004/0135775 A1 | 7/2004 | Hurst et al. | |
| 2005/0012644 A1 | 1/2005 | Hurst et al. | |
| 2006/0097991 A1 | 5/2006 | Hotelling et al. | |

(Continued)

OTHER PUBLICATIONS

USPTO, Ex parte Quayle Office Action for U.S. Appl. No. 12/879,474, mailed May 15, 2013.

(Continued)

*Primary Examiner* — Manuel L Barbee
(74) *Attorney, Agent, or Firm* — Osha Liang LLP

(57) ABSTRACT

A processing system for an input device includes a transmitter module, a receiver module, and a determination module. The transmitter module including transmitter circuitry, and is configured to drive a first end of a transmitter electrode such that the transmitter electrode exhibits a first voltage gradient extending from the first end of the transmitter electrode toward a second end of the transmitter electrode, wherein the first voltage gradient comprises a set of substantially discrete voltage values. The receiver module includes receiver circuitry, the receiver module configured to receive a first resulting signal with a first receiver electrode while the transmitter module is driving the first end of the transmitter electrode. The determination module is configured to compute a first measurement of a change in capacitive coupling between the transmitter electrode and the receiver electrode based on the first resulting signal, and determine positional information for an input object based on the first measurement.

20 Claims, 10 Drawing Sheets

(56) References Cited

U.S. PATENT DOCUMENTS

| | | | |
|---|---|---|---|
| 2007/0063876 A1* | 3/2007 | Wong | 341/34 |
| 2007/0222763 A1 | 9/2007 | Spath | |
| 2007/0247443 A1 | 10/2007 | Philipp | |
| 2008/0006453 A1 | 1/2008 | Hotelling | |
| 2008/0158167 A1* | 7/2008 | Hotelling et al. | 345/173 |
| 2008/0246496 A1 | 10/2008 | Hristov et al. | |
| 2009/0091551 A1 | 4/2009 | Hotelling et al. | |
| 2009/0194344 A1 | 8/2009 | Harley et al. | |
| 2009/0267914 A1 | 10/2009 | Dews et al. | |
| 2010/0007625 A1 | 1/2010 | Jiang et al. | |
| 2010/0045632 A1 | 2/2010 | Yilmaz et al. | |
| 2010/0214231 A1 | 8/2010 | D'Souza et al. | |
| 2010/0258360 A1 | 10/2010 | Yilmaz | |
| 2010/0328255 A1 | 12/2010 | Ishizaki et al. | |
| 2011/0043478 A1 | 2/2011 | Matsushima | |
| 2011/0048813 A1 | 3/2011 | Yilmaz | |
| 2011/0062969 A1 | 3/2011 | Hargreaves et al. | |
| 2011/0148435 A1* | 6/2011 | Schwartz et al. | 324/658 |

OTHER PUBLICATIONS

United States Patent and Trademark Office, Non-Final Office Action mailed Sep. 6, 2012 for U.S. Appl. No. 12/847,598.

ISA/KR "International Search Report and Written Opinion" mailed Apr. 28, 2011 for International Appln. No. PCT/US2010/048319.

United States Patent and Trademark Office, US Non-final Office Action for U.S. Appl. No. 12/879,474, dated Dec. 28, 2012.

* cited by examiner

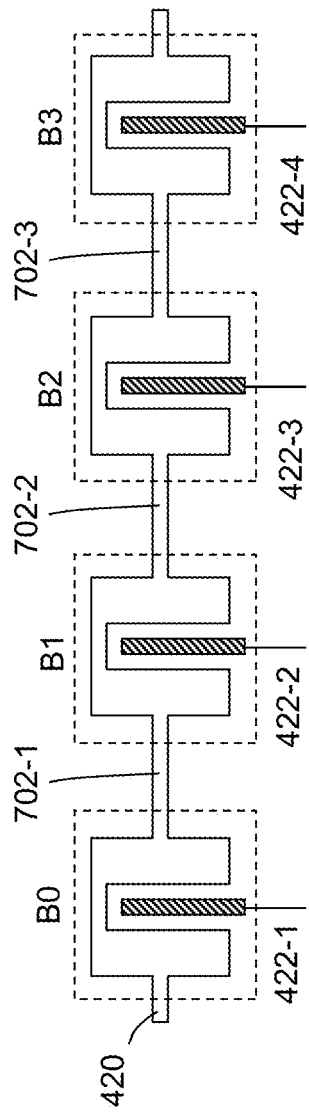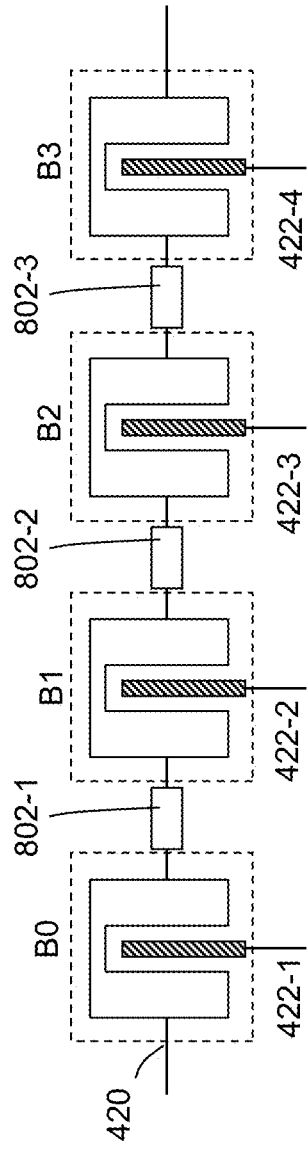
FIG. 8
FIG. 9

SYSTEMS AND METHODS FOR VOLTAGE GRADIENT SENSOR DEVICES

FIELD OF THE INVENTION

This invention generally relates to electronic devices, and more specifically relates to sensor devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers).

Gradient sensors are sensors that employ a voltage variation across one or more electrodes (usually a transmitter electrode) to assist in determining positional information. While gradient sensors are advantageous in a number of respects, noise experienced by such sensors during operation, particularly unison noise, can give rise to undesirable results. Accordingly, there is a need for improved sensor systems and methods capable of reducing unison and/or other forms of noise.

BRIEF SUMMARY OF THE INVENTION

A processing system in accordance with one embodiment includes a transmitter module, a receiver module, and a determination module. The transmitter module includes transmitter circuitry, and is configured to drive a first end of a transmitter electrode such that the transmitter electrode exhibits a first voltage gradient extending from the first end of the transmitter electrode toward a second end of the transmitter electrode. The receiver module includes receiver circuitry, the receiver module configured to receive a first resulting signal with a first receiver electrode and a second resulting signal with a second receiver electrode, wherein the first receiver electrode and the second receiver electrode are proximate to corresponding discrete regions of the transmitter electrode. The determination module is configured to compute a first measurement of a change in capacitive coupling between the transmitter electrode and the first receiver electrode based on the first resulting signal and a second measurement of a change in capacitive coupling between the transmitter electrode and the second receiver electrode based on the second resulting signal, and determine a button response for an input object based on at least one of the first measurement and the second measurement.

A processing system in accordance with another embodiment includes a transmitter module, a receiver module, and a determination module. The transmitter module including transmitter circuitry, and is configured to drive a first end of a transmitter electrode such that the transmitter electrode exhibits a first voltage gradient extending from the first end of the transmitter electrode toward a second end of the transmitter electrode, wherein the first voltage gradient comprises a set of substantially discrete voltage values. The receiver module includes receiver circuitry, the receiver module configured to receive a first resulting signal with a first receiver electrode while the transmitter module is driving the first end of the transmitter electrode. The determination module is configured to compute a first measurement of a change in capacitive coupling between the transmitter electrode and the receiver electrode based on the first resulting signal, and determine positional information for an input object based on the first measurement.

A capacitive sensor device in accordance with one embodiment includes a processing system, a transmitter electrode, and a plurality of receiver electrodes, wherein each receiver electrode of the plurality of receiver electrodes is adjacent to a corresponding discrete region of the transmitter electrode. The processing system is communicatively coupled to the transmitter electrode and the plurality of receiver electrodes and is configured to drive a first end of the transmitter electrode such that the transmitter electrode exhibits a first voltage gradient extending from the first end of the transmitter electrode toward a second end of the transmitter electrode; receive a first resulting signal with a first receiver electrode of the plurality of receiver electrodes; compute a first measurement of a change in capacitive coupling between the transmitter electrode and the first receiver electrode based on the first resulting signal; and determine a button response for an input object based on the first measurement.

BRIEF DESCRIPTION OF DRAWINGS

The preferred exemplary embodiment of the present invention will hereinafter be described in conjunction with the appended drawings, where like designations denote like elements, and:

FIG. 8 is a conceptual diagram of electrodes in accordance with one embodiment of the invention;

FIG. 9 is a conceptual diagram of electrodes in accordance with one embodiment of the invention;

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 1:
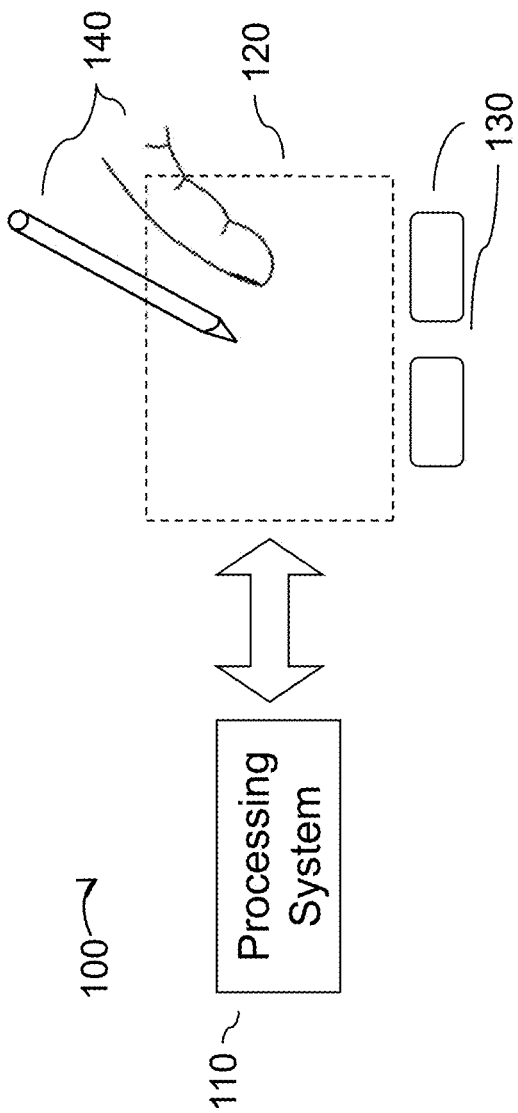
FIG. 1 is a block diagram of an exemplary system that includes an input device in accordance with an embodiment of the invention.

Various embodiments of the present invention provide input devices and methods that facilitate improved usability. FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In some embodiments, a sensor pattern is "scanned" to determine the capacitive couplings. That is, the transmitter electrodes are driven with transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The receiver sensor electrodes may be operated singly or multiply to acquire resulting signals. The resulting signals may be used to determine measurements of the capacitive couplings. A set of measured values from the capacitive pixels form a "capacitive frame" representative of the capacitive couplings. Multiple capacitive frames may be acquired over multiple time periods, and differences between them used to derive information about input in the sensing region. For example, successive capacitive frames acquired over successive periods of time can be used to track the motion(s) of one or more input objects entering, exiting, and within the sensing region.

Processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, as described in further detail below, a processing system for a mutual capacitance sensor device may comprise transmitter circuitry configured to transmit signals with transmitter sensor electrodes, and/or receiver circuitry configured to receive signals with receiver sensor electrodes). In various embodiments, as described in further below, a processing system for a mutual capacitance sensor device may comprise transmitter circuitry configured to drive a first and second end of a transmitter electrode such that the transmitter electrode exhibits differing voltage gradients extending from the first end to the second end of the transmitter electrode and a receiver module configured to receive resulting signals with at least two receiver electrodes when the transmitter electrode exhibits the voltage gradients.

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In one embodiment, processing system 110 includes determination circuitry configured to determine positional information for an input device based on the measurement.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
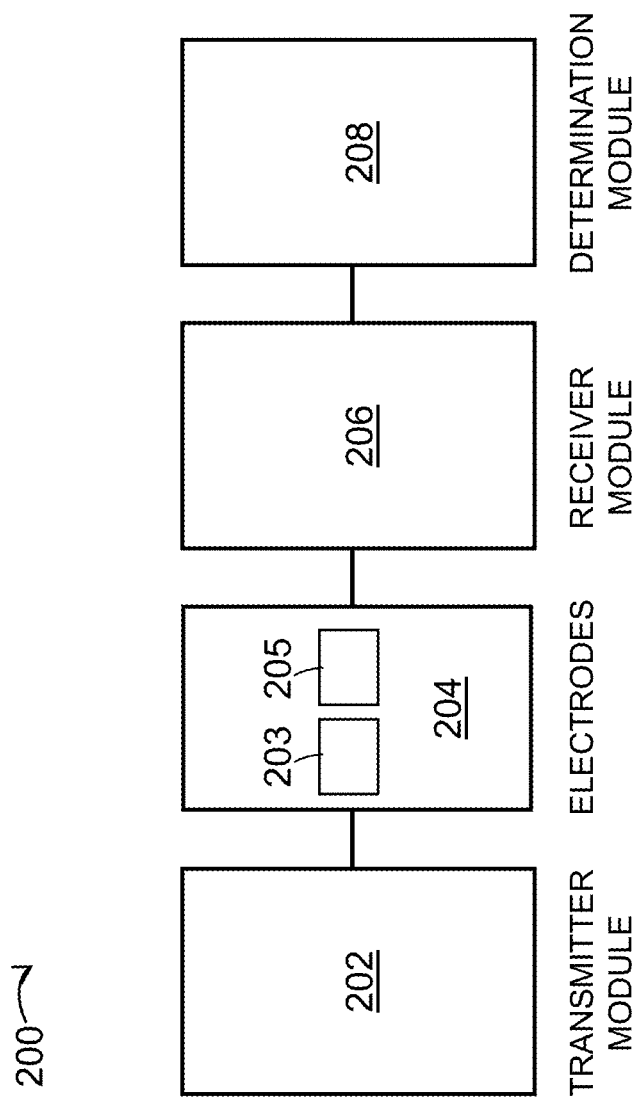
FIG. 2 is a conceptual block diagram depicting an exemplary embodiment of the present invention.

Referring now to the conceptual block diagram depicted in FIG. 2, various embodiments of an exemplary processing system 110 as shown in FIG. 1 may include a system 200. System 200, as illustrated, generally includes transmitter module 202 communicatively coupled via a set of electrodes (or simply "electrodes") 204 to receiver module 206, which itself is coupled to determination module 208. Electrodes 204 include one or more transmitter electrodes 203 and one or more receiver electrodes 205.

Transmitter module 202 includes any combination of hardware and/or software configured to transmit with transmitter electrodes 203. In one embodiment, transmitter module 202 is configured to drive a transmitter electrode of transmitter electrodes 203 such that the transmitter electrode exhibits a voltage gradient extending from a first end of the transmitter electrode toward a second end of the transmitter electrode. As described in further detail below, the voltage gradient may be continuous and/or comprise a set of substantially discrete voltage values. In one embodiment, electrodes 204 may be constructed from opaque or substantially opaque conductive materials. In other embodiments, electrodes 204 can be constructed from transparent or substantially transparent conductive material, such as patterned ITO, ATO, carbon fiber nanotubes, or other substantially transparent materials. Further, electrodes 204 may be constructed from a contiguous resistive material, such as ITO, ATO or the like. In one embodiment, transmitter electrodes 203 are constructed from a conductive material of substantially uniform resistivity, so that voltage variations can be imposed on it by the driving methods described below. In some embodiments, the conductive material may have non-uniform resistivity, such as having a higher or lower resistivity on the distal ends than in the middle portion. Other forms of non-uniform resistivity can also be accommodated. In yet other embodiments, the resistance of transmitter electrodes 203 may increase between discrete regions of the transmitter electrode. In such embodiments, transmitter electrodes 203 may comprise regions of substantially high conductance separated by regions of increased resistance, or transmitter electrodes 203 may comprise regions of first resistance value separate by regions of a second resistance value, where the second resistance value is greater than the first resistance value. In one embodiment, the voltage gradients may be defined as the amount of change in voltage as a function of a small change in position along a transmitter electrode comprising resistive material.

Receiver module 206 includes any combination of hardware and/or software configured to receive resulting signals with receiver electrodes 205 while transmitter module 202 is driving one or more transmitter electrodes 203. As described in further detail below, in one embodiment in which multiple receiver electrodes 205 are employed, receiver module 206 may configured to receive a first resulting signal with a first receiver electrode and a second resulting signal with a second receiver electrode, wherein the first and second receiver electrodes are proximate to corresponding discrete regions of the transmitter electrode. In another embodiment, in which transmitter module 202 is configured to drive a voltage gradient comprising a set of substantially discrete voltage values, a resulting signal may be received from single receiver electrode.

Determination module 208 includes any combination of hardware and/or software configured to compute measurements of changes in capacitive coupling between one or more transmitter electrodes 203 and one or more receiver electrodes 205 based on the resulting signals, and then determine positional information for an input object and/or a button response for an input object based on those measurements.

Figure 3:
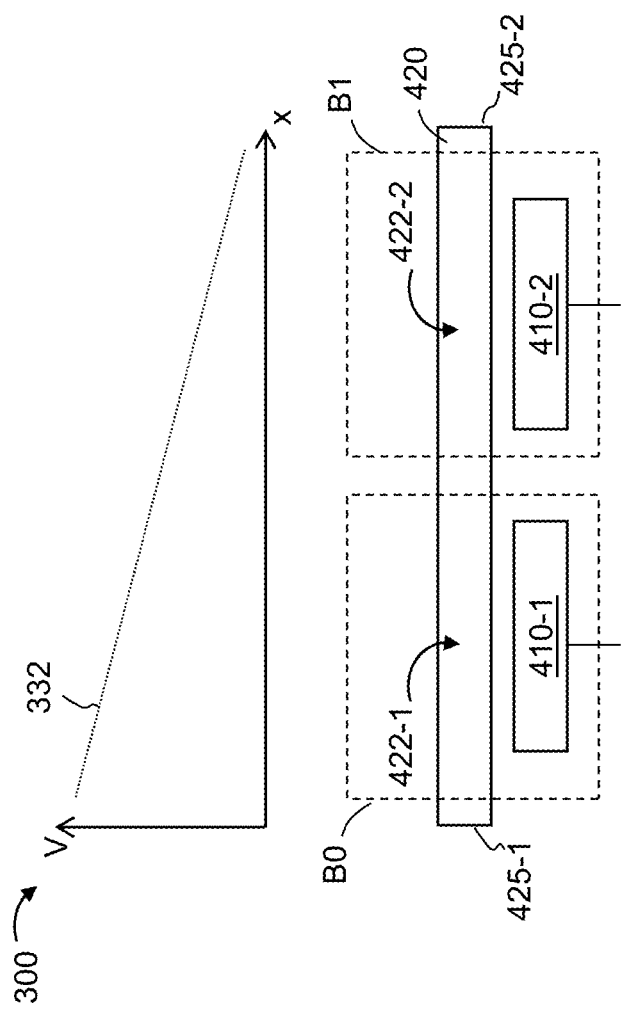
FIG. 3 is a conceptual diagram of electrodes and an associated voltage gradient in accordance with one embodiment of the invention.
Figure 4:
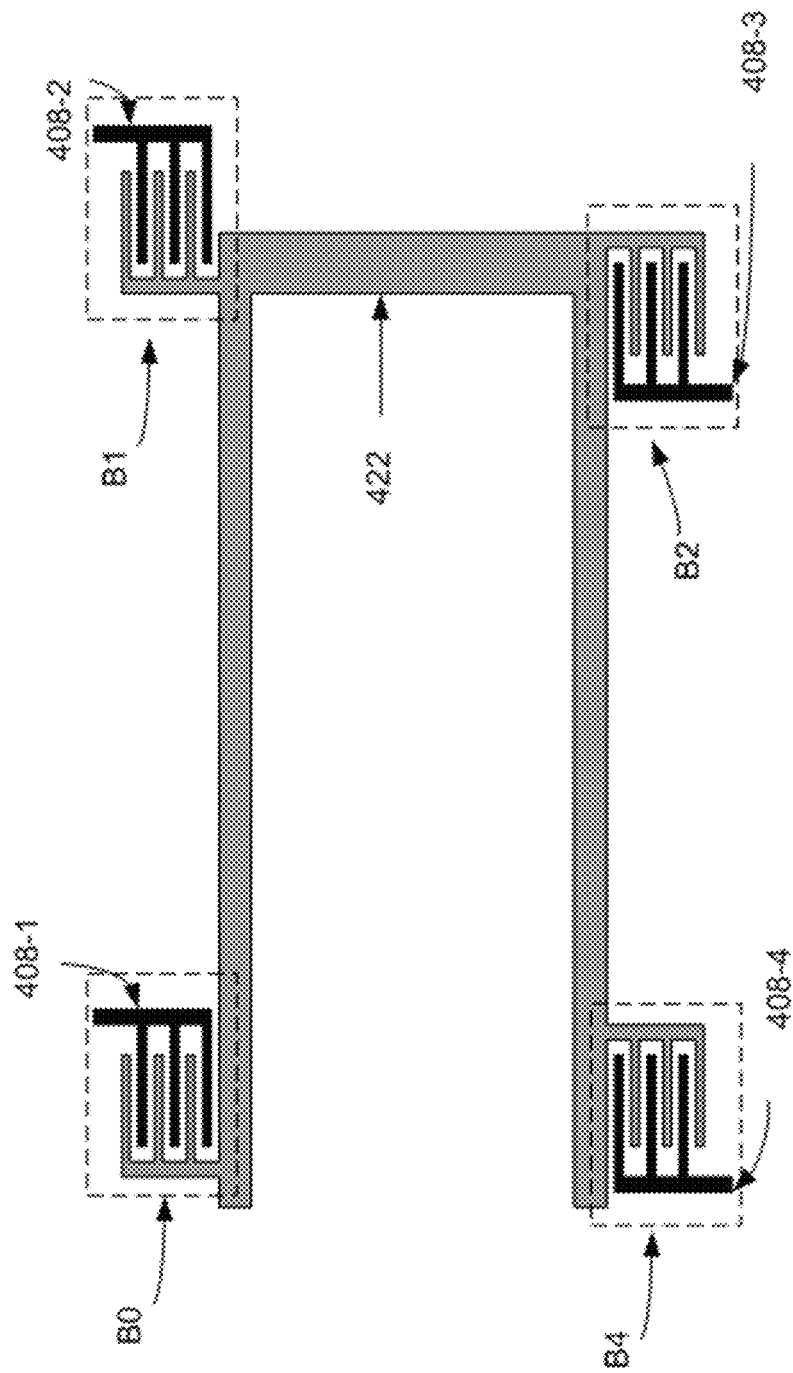
FIG. 4 is a conceptual diagram of electrodes in accordance with one embodiment of the invention.

Referring now to the exemplary embodiment depicted in FIG. 3 in conjunction with FIG. 2, a single transmitter electrode 420 and two receiver electrodes 410 (i.e., 410-1 and 410-2) are illustrated. In the illustrated embodiment, electrodes 410 are proximate to corresponding discrete regions 422 of transmitter electrode 420, which extends from a first end 425-1 to a second end 425-2. Thus, receiver electrode 410-1 is proximate to discrete region 422-1, and receiver electrode 410-2 is proximate to discrete region 422-2. In this regard, it will be understood that the electrode configuration depicted in FIG. 3 is merely an example, and does not limit the range of embodiments with respect to either the size, scale, position, and geometry of the electrodes. For example, while receiver electrodes 410-1 and 410-2 are depicted as substantially proximate to discrete regions 422-1 and 422-2 in a single plane, in various embodiments electrodes 410-1 and 410-2 may be proximate in one or more additional planes. For example, receiver electrodes 410 may be placed on top of or underneath discrete regions 422, separated by an insulating layer. Further, while electrodes 420 and 410 are depicted as rectangular, they may be implemented as any suitable electrode shape, and have a variety of orientations with respect to each other. In one embodiment, transmitter electrode 420 comprises at least one angular region. In another embodiment, the shape of transmitter electrode 420 varies over its length. In some embodiments, the shape of receiver electrodes 410 is different from the shape of transmitter electrode 420. In further embodiments, transmitter electrode 420 may be interdigitated with one or more receiver electrodes, such as electrodes 408-1, 408-2, 408-3, and 408-4 shown in FIG. 4. In yet other embodiments, the shape of transmitter electrode 420 may comprise at least one change of direction. For example, FIG. 4 illustrates transmitter electrode 420 comprising a "U" shape, wherein the transmitter electrode comprises two changes of direction.

Figure 7:
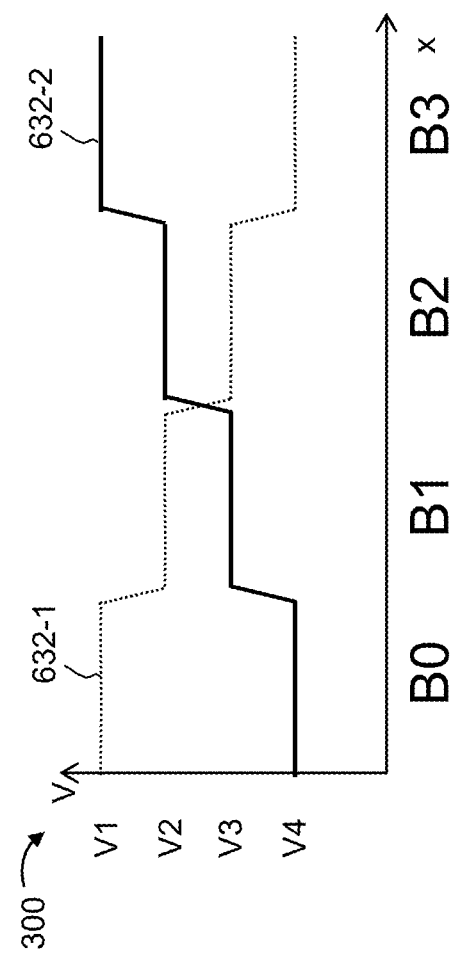
FIG. 7 is a conceptual diagram of a voltage gradient in accordance with one embodiment of the invention.

In other embodiments, transmitter electrode 420 may comprise a single change of direction or more than two changes of direction. Further, FIG. 4 illustrates four receiver electrodes 408-1-408-4 interdigitated with transmitter electrode 420, forming button regions B0-B3. In one embodiment, transmitter electrode 420 and receiver electrodes 408-1-408-4 may be disposed beneath a sensor device. In one embodiment, transmitter electrode 420 and receiver electrodes 408-1-408-4 may function as part of a larger sensor device. For example, transmitter electrode 420 and receiver electrodes 408-1-408-4 may be one part of a force sensing device. Further, while FIG. 4 illustrates four receiver electrodes forming four corresponding button regions, other numbers of receiver electrodes and corresponding button regions may be used. In other embodiments, as depicted in FIGS. 7 and 8, the transmitter electrode and receiver electrode(s) are disposed substantially perpendicular to each other.

Referring again to FIG. 3, in the illustrated embodiment, regions 422 of transmitter electrode 420 and the respective proximate receiver electrodes 410 generally define logical and/or physical button regions, denoted in by 'B0' and "B1". That is, as described in further detail below, determination module 208 is configured, in part, to determine a button response for an input object, wherein that button response is associated with a particular, defined button region (e.g., B0 or B1). Just as the size and shape of electrodes in FIG. 3 are not limiting in any way, so too button regions B0 and B1. In one embodiment, a button region corresponds to the area of capacitive coupling between a transmitter and receiver electrode. For example, button region B0 corresponds to the region of capacitive coupling between transmitter electrode 420 and receiver electrode 410-1. Further, button region B1 corresponds to the region of capacitive coupling between transmitter electrode 410 and receiver electrode 410-2. While not shown, in some embodiments, button regions B0 and B1 may overlap. In various embodiments, signal processing techniques and sensor designs may be employed to further define or bound a button region. Such signal processing techniques and sensor designs may minimize the overlap between button regions.

Transmitter module 202 is configured to be coupled to one or more ends 425-1 and 425-2 of transmitter electrode 420 such that end 425-1 and/or end 425-2 may be driven by transmitter module 202. Consequently, as depicted in exemplary plot 300, transmitter electrode 420 exhibits a voltage gradient 332 extending from a first end of transmitter electrode 420 (e.g., end 425-1) to a second end of transmitter electrode 420 (e.g., end 425-2). In plot 300, the x axis corresponds to a distance along transmitter electrode 420, and the y axis corresponds to a voltage (V) exhibited by transmitter electrode 420. For simplicity, voltage gradient 332 is depicted as a linear function. The invention is not so limited, however. Voltage gradient 332 may be linear, stair-stepped, non-linear, piecewise linear, smooth (differentiable), non-smooth, or be characterized by any other desired mathematical function. In various embodiments, and as will be described in more detail below, the shape and/or other characteristics of the voltage gradient corresponds to features of the transmitter electrode. Thus, the term "gradient sensor" is used herein without loss of generality.

As used herein, "driving" a signal with respect to a particular end 425 of a transmitter electrode refers to imparting or otherwise causing a voltage to be imposed on that end. In various embodiments, imparting or otherwise causing a voltage to be imposed on an end of the transmitter electrode comprises driving an end with a signal, wherein the signal comprises a plurality of pulses or voltage transitions. Further, in some embodiments imparting or otherwise causing a voltage to be imposed on an end of the transmitter electrode comprises driving an end of the transmitter electrode with a substantially constant voltage. In some embodiments, end 425-1 is driven with a signal while end 425-2 is driven with a substantially constant voltage. In other embodiments, end 425-2 is driven with a varying signal, while end 425-1 is driven with a constant voltage. In other embodiments, end 425-1 or 425-2 is allowed to float, while the other end is driven with a varying signal. In accordance with another embodiment, a first end and a second end of transmitter electrode 420 are driven with the same signal. In accordance with another embodiment, a first end of electrode 420 is driven with a first signal while a second end is driven with a second signal, wherein the first and second signals are different in some respect. In one embodiment, the first and second signals are different in at least one of amplitude, polarity, frequency, and phase. While many different combinations of driving modes may be used to generate the different first and second voltage gradients, in one embodiment, the driving modes are selected such that the first and second voltage gradients are being generally non-proportional. For example, if a first driving mode comprises allowing one end 425-1 or 425-2 to electrically float, then during the second driving mode that end of transmitter electrode 420 is either driven with a signal or a constant voltage. Similarly, if a first driving mode and a second driving mode comprise driving ends 425-1 and 425-2 with different signals, the signals used in the first and second driving mode create different, non-proportional voltage gradients. In embodiments that include multiple transmitter electrodes (one example embodiment is described below in conjunction with FIG. 10, for example) each end of the electrodes may be commonly or individually driven. Thus, for example, a first end of at least two transmitter electrodes may be configured to be driven simultaneously, while a second end of the at least two transmitter electrodes may be configured to be driven individually. In another embodiment, the first ends of at least two transmitter electrodes are configured to be driven simultaneously while the second ends of the transmitter electrodes are also configured to be driven simultaneously.

Figure 5:
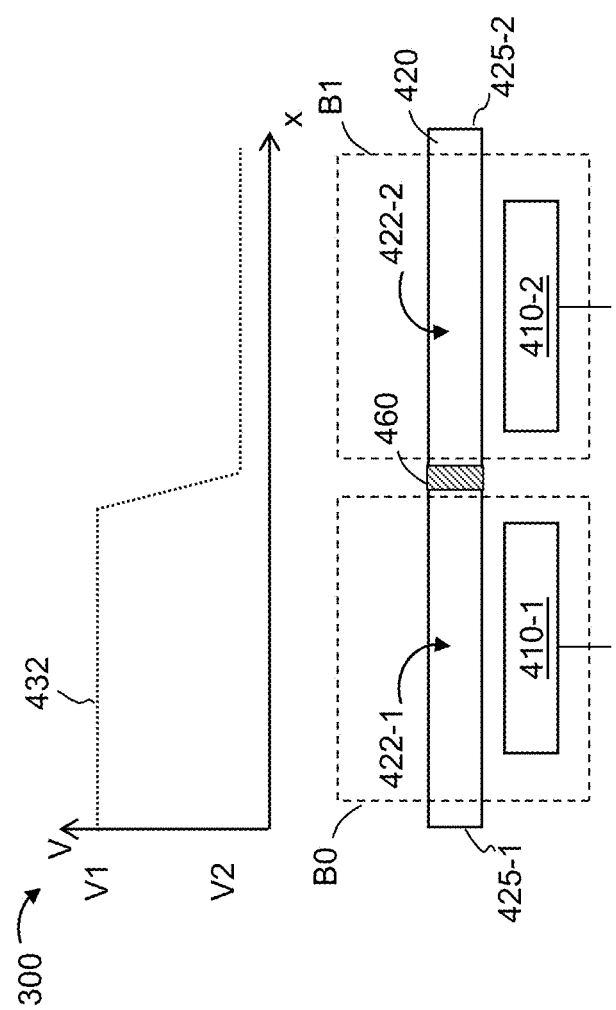
FIG. 5 is a conceptual diagram of electrodes and an associated voltage gradient in accordance with one embodiment of the invention.

Referring now to FIG. 5, in accordance with one embodiment, transmitter electrode 420 is driven such that it exhibits a voltage gradient that comprises a set of substantially discrete voltage values, each associated with a respective discrete region 422 of transmitter electrode 420. That is, as illustrated in FIG. 5, voltage gradient 432 may have two discrete voltage values: V1 and V2. Each of V1 and V2 may be positive, negative, or correspond to a voltage value of zero. Discrete voltage value V1 corresponds to discrete region 422-1 of transmitter electrode 420, and discrete voltage value V2 corresponds to discrete region 422-2 of transmitter electrode 420.

While FIG. 5 depicts a voltage gradient 432 having two discrete voltage values, any number of such discrete voltage values may be employed, depending, for example, on the number of button regions being implemented. For example, referring momentarily to FIG. 7, plot 300 depicts an embodiment in which four discrete voltage values are employed for voltage gradient 632-1: V1, V2, V3, and V4. In various embodiments, the discrete voltage values monotonically increase from end 425-1 to end 425-2 of transmitter electrode 420. In other embodiments, the discrete voltage values vary non-monotonically from end 425-1 to end 425-2. In some embodiments, the discrete voltage values are equally spaced (i.e., have a uniform voltage difference therebetween). In other embodiments, the discrete voltage values are non-equally spaced. Similarly, the discrete regions 422 (and consequently, button regions B0 and B1) may have the same width or length, or may have different widths and lengths.

Figure 11:
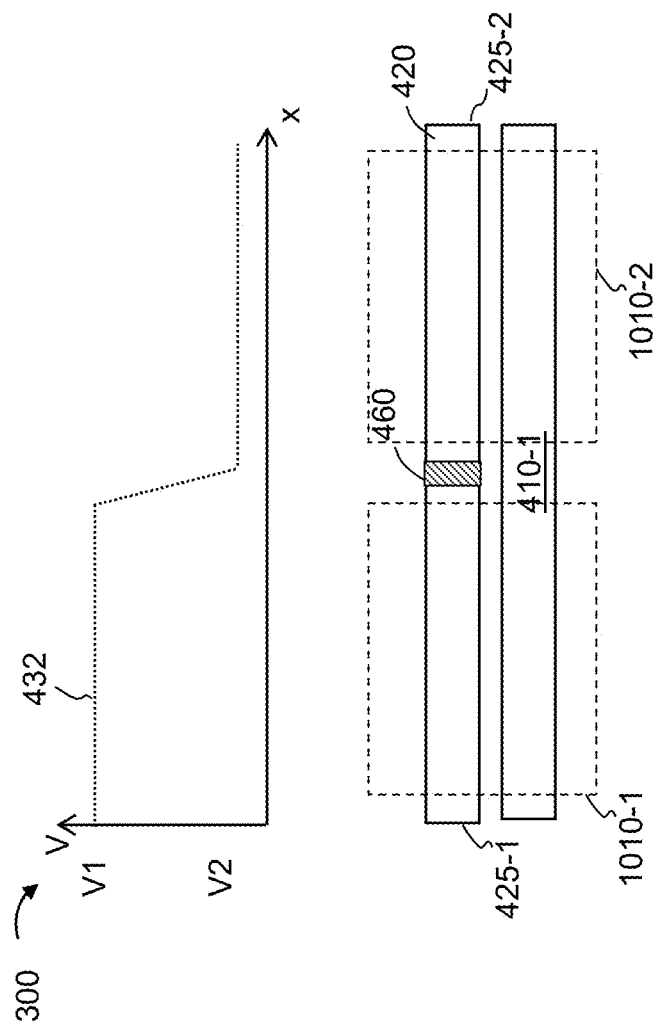
FIG. 11 is a conceptual diagram of electrodes and an associated voltage gradient in accordance with one embodiment of the invention.

While the embodiment of FIG. 5 comprises receiver electrode 410-1 and receiver electrode 410-2, in an alternate embodiment, a voltage gradient having discrete voltage values is employed in conjunction with a single receiver electrode. As illustrated in the embodiment of FIG. 11, an electrode 420 is configured such that, when end 425-1 and/or end 425-2 is driven by transmitter module 202, transmitter electrode 420 exhibits a voltage gradient 432 having substantially discrete voltage values (e.g., V1 and V2). Receiver module 206 is configured to receive a resulting signal with receiver electrode 410-1, and determination module 208 is configured to compute a measurement of a change in capacitive coupling between transmitter electrode 420 and receiver electrode 410-1 based on the resulting signal. Determination module 208 then determines positional information based on this measurement. In one embodiment the positional information is zero-dimensional information (for example, indicative of a button press). In another embodiment, the positional information is one-dimensional information (for example, indicative of a position along a slider region). In other embodiments, measurements over time (multiple capacitive frames) may be used to determine whether an input object is moving from region 1010-1 to 1010-2 or from 1010-2 to 1010-1. In such embodiments, directional information may be determined for the input object. In one embodiment, region 1010-1 may correspond and function similar to B0 of FIG. 5 and region 1010-2 may correspond and function similar to B1 of FIG. 5. In various embodiment, more than two regions (e.g., 1010-1 and 1010-2) may be present, where each region corresponds to discrete voltage value of the voltage gradient 432.

Figure 6:
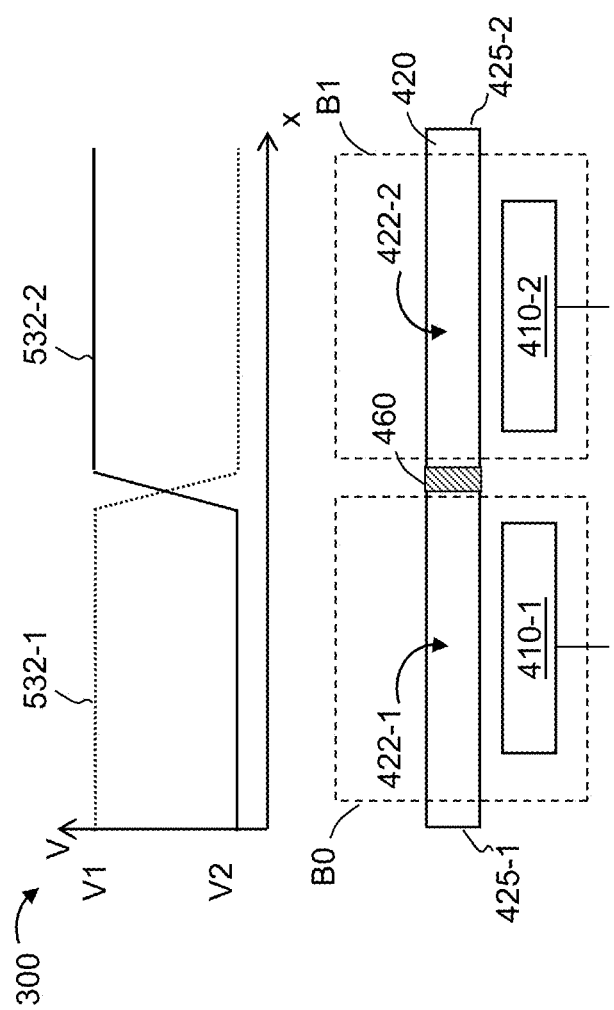
FIG. 6 is a conceptual diagram of electrodes and an associated voltage gradient in accordance with one embodiment of the invention.

Referring now to FIG. 6 in conjunction with FIG. 3, transmitter module 202 may be configured to drive the first end 425-1 of transmitter electrode 420 such that transmitter electrode 420 exhibits a second voltage gradient 532-2 extending from the first end 425-1 toward the second end 425-2 of the transmitter electrode, wherein the first voltage gradient 532-1 and the second voltage gradient 532-2 are non-proportional or otherwise different. In one embodiment, voltage gradients 532-1 and 532-2 are selected such that neither of the voltage gradients is a linear function of the other voltage gradient and such that each voltage gradient provides mathematically independent results.

Further in accordance with the embodiment depicted in FIG. 6, receiver module 206 may be configured to receive a third resulting signal with the first receiver electrode and a fourth resulting signal with the second receiver electrode when the transmitter electrode exhibits the voltage gradient 532-2. Stated another way, four resulting signals may be received by receiver module 206 from receiver electrodes 410-1 and 410-2: two while transmitter electrode is exhibiting voltage gradient 532-1, and two while transistor electrode is exhibiting voltage gradient 532-2. Determination module 208 may then determine a button response based on the four resulting signals.

In various embodiments, the number of discrete regions and discrete voltage values is greater than two. Thus, as shown in FIG. 7, two four-level stair-step voltage gradients 632-1 and 632-2 may be employed. For simplicity, the transmitter electrode and receiver electrodes have not been illustrated, and have been replaced by button region designations B0, B1, B2, and B3. In this embodiment, receiver module 206 is configured to receive a set of resulting signals corresponding to respective button regions while the transmitter electrode exhibits voltage gradient 632-1, and receive another set of resulting signals corresponding to respective button regions while the transmitter electrode exhibits voltage gradient 632-2.

In one embodiment, a linear system of equations is generated from the measurements of change in capacitive coupling between transmitter and receiver electrodes. The linear system of equations may then be used to determine a button response for each button region. Each button region may be represented as an unknown value in the linear system of equations. For example, in the embodiment of FIG. 6, a first measurement of a change in capacitive coupling between transmitter electrode 420 and receiver electrode 410-1 and a second measurement of a change in capacitive coupling between transmitter electrode 420 and receiver electrode 410-2 may be computed when the transmitter electrode exhibits voltage gradient 532-1. Further, a third measurement of a change in capacitive coupling between transmitter electrode 420 and receiver electrode 410-1 and a fourth measurement of a change in capacitive coupling between transmitter electrode 420 and receiver electrode 410-2 may be computed when the transmitter electrode exhibits voltage gradient 532-2. The first, second, third and fourth measurements may be then used to generate a linear system of equations that can be used to determine a button response for button region B0 and a button response for button region B1. The button responses may be represented as two unknown values within the linear system of equations. In such an embodiment, the linear system of equations comprises four measurements, allowing the two unknown values to be determined, producing two determined values.

In one embodiment, each determined value may be further processed to determine a button response for each button region. For example, a button response may indicate the state of a button region, such as "activated", "non-activated" or some other state. In one embodiment the button response is a binary response, indicating "activated" and "non-activated" states. In other embodiments, additional states are indicated. To determine a button response, the determined values may be compared to one more threshold values. In one embodiment, when the determined value satisfies a threshold value, the button response indicates a state of "activated" for a corresponding button region. In a further embodiment, the determined value may be compared to a first threshold and second threshold to determine the button response for button region. In such an embodiment, when the determined value satisfies the first threshold and satisfies the second threshold a button response of "activated" may be indicated for a corresponding button region. In further embodiments, the button response is based on but not limited to other criteria, such as the duration that the determined value satisfies the threshold or thresholds, the amount that the determined value varies over time, and/or the button responses of other button regions.

The embodiment of FIG. 7 illustrates four button regions, B0-B3. In such an embodiment, when the transmitter electrode exhibits two voltage gradients 632-1 and 632-2, a measurement corresponding to each button region for each voltage gradient can be computed. As such, each measurement corresponds to a measurement of a change in capacitive coupling between the transmitter electrode and a respective receiver electrode. The eight measurements may then be used to determine a linear system of equations, as described above, and the linear system of equations may be used to determine a button response for each button region. Each button response may be represented as an unknown value in the linear system of equations.

Referring again to FIG. 5, transmitter electrode 420 can be made to exhibit the discrete voltage values in a number of ways. For example, and as described in further detail below, the resistance of transmitter electrode 420 may increase between each of the discrete regions 422. In FIGS. 4 and 5, this is illustrated generally by a region 460 between regions 422-1 and 422-2. In one embodiment, region 460 comprises a discrete resistive element. In other embodiments, the properties of transmitter electrode 420 are varied in region 460 to create a region of higher resistance. In another embodiment, region 460 comprises a material having a higher resistance (e.g., higher resistivity). In a further embodiment, as shown in FIG. 8, transmitter electrode 420 is implemented as a contiguous resistive material, for example, indium tin oxide (ITO) or the like, and where the resistance increase between discrete regions is provided by a higher-resistance portion of the resistive material. In one embodiment, portions 702-1, 702-2, and 702-3 of transmitter electrode 420 are configured such that their cross-sections (not illustrated) are reduced with respect to other portions of transmitter electrode 420 (that is, in top view, those portions have a reduced width). As a result, the ohmic resistance of portions 702-1, 702-2, and 702-3 is higher. The resistances can be selected to achieve any desired discrete voltage values. In other embodiments, the depth of transmitter electrode 420 in portions 702-1, 702-2 and 702-3 is reduced, increasing the resistance in those portions. Any other suitable means of increasing the ohmic resistance may be employed. The resistance and/or the geometry of portions 702-1, 702-2, and 702-3 may be the same or may vary from portion to portion. In an alternate embodiment, depicted in FIG. 9, individual resistors (e.g., surface mount resistors) 802-1, 802-2, and 802-3 are employed. As with the embodiment shown in FIG. 8, resistors 422 may have respective resistance values that are substantially equal or vary from resistor to resistor.

Figure 10:
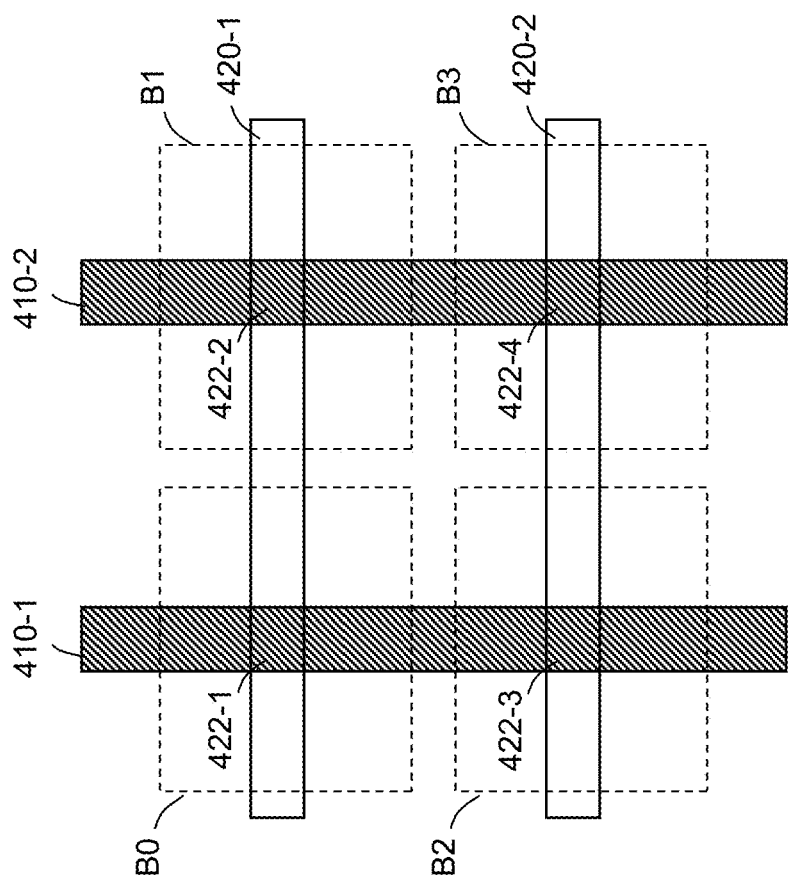
FIG. 10 is a conceptual diagram of electrodes in accordance with one embodiment of the invention.

In accordance with a further embodiment, multiple transmitter electrodes are employed. FIG. 10, for example, depicts an embodiment that includes two transmitter electrodes (420-1 and 420-2) and two receiver electrodes (410-1 and 410-2). Transmitter electrode 420-1 is proximate to receiver electrode 410-1 in discrete region 422-1 and proximate to receiver electrode 410-2 in discrete region 422-2. Similarly, transmitter electrode 420-2 is proximate to receiver electrode 410-1 in discrete region 422-3 and proximate to receiver electrode 410-2 in discrete region 422-4. Thus, four button regions B0, B1, B2, and B3 are defined. For the purposes of this example, it is assumed that an insulating layer is provided between one later comprising transmitter electrodes 420, and a second layer comprising receiver electrodes 410. However, in other embodiments, electrodes 420-1 and 420-2 are disposed on a single layer.

In an alternate embodiment, a voltage gradient having discrete voltage values is employed in conjunction with a single receiver electrode. Referring to FIG. 11 in conjunction with FIG. 3, for example, in accordance with the illustrated embodiment an electrode 420 is configured such that, when end 425-1 and/or end 425-2 is driven by transmitter module 202, transmitter electrode 420 exhibits a voltage gradient 432 having substantially discrete voltage values (e.g., V1 and V2). Receiver module 206 is configured to receive a resulting signal with receiver electrode 410-1, and determination module 208 is configured to compute a measurement of a change in capacitive coupling between transmitter electrode 420 and receiver electrode 410-1 based on the resulting signal. Determination module 208 then determines positional information based on this measurement. In one embodiment the positional information is zero-dimensional information (for example, indicative of a button press). In another embodiment, the positional information is one-dimensional information (for example, indicative of a position along a slider region). As described above, positional information for an input object may be determined by creating a linear system of equations based on the measurements of capacitive coupling between the transmitter and receiver electrodes when the transmitter electrode exhibits the first and second voltage gradients. The linear system of equations may be solved, creating a set of determined values; which may then be used to determine the positional information.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system for an input device, the processing system comprising:
  a transmitter module including transmitter circuitry, the transmitter module configured to drive a first end of a transmitter electrode such that the transmitter electrode exhibits a first voltage gradient extending from the first end of the transmitter electrode toward a second end of the transmitter electrode;
  a receiver module including receiver circuitry, the receiver module configured to receive a first resulting signal with a first receiver electrode and a second resulting signal with a second receiver electrode, wherein the first receiver electrode and the second receiver electrode are proximate to corresponding discrete regions of the transmitter electrode; and
  a determination module configured to compute a first measurement of a change in capacitive coupling between the transmitter electrode and the first receiver electrode based on the first resulting signal, compute a second measurement of a change in capacitive coupling between the transmitter electrode and the second receiver electrode based on the second resulting signal, and determine a button response for an input object based on at least one of the first measurement and the second measurement.

2. The processing system of claim 1, wherein the first voltage gradient comprises a set of substantially discrete voltage values, each associated with a respective discrete region of the discrete regions of the transmitter electrode.

3. The processing system of claim 2, wherein the substantially discrete voltage values monotonically increase from the first end of the transmitter electrode to the second end of the transmitter electrode.

4. The processing system of claim 1, wherein the resistance of the transmitter electrode increases between each of the discrete regions of the transmitter electrode.

5. The processing system of claim 1, wherein the transmitter electrode comprises a contiguous resistive material.

6. The processing system of claim 1, wherein the transmitter module is configured to drive the first end of the transmitter electrode such that the transmitter electrode exhibits a second voltage gradient extending from the first end of the transmitter electrode toward the second end of the transmitter electrode, wherein the first voltage gradient and the second voltage gradient are non-proportional.

7. The processing system of claim 6, wherein the receiver module is further configured to receive a third resulting signal with the first receiver electrode and a fourth resulting signal with the second receiver electrode when the transmitter electrode exhibits the second voltage gradient.

8. The processing system of claim 1, wherein the transmitter module is configured to drive a second transmitter electrode, and wherein the first receiver electrode and the second receiver electrode are disposed proximate to respective discrete regions of the second transmitter electrode.

9. A processing system for an input device, the processing system comprising:
a transmitter module including transmitter circuitry, the transmitter module configured to drive a first end of a transmitter electrode such that the transmitter electrode exhibits a first voltage gradient extending from the first end of the transmitter electrode toward a second end of the transmitter electrode, wherein the first voltage gradient comprises a set of substantially discrete voltage values;
a receiver module including receiver circuitry, the receiver module configured to receive a first resulting signal with a first receiver electrode while the transmitter module is driving the first end of the transmitter electrode;
a determination module including determination circuitry, the determination circuitry configured to compute a first measurement of a change in capacitive coupling between the transmitter electrode and the first receiver electrode based on the first resulting signal, and determine positional information for an input object based on the first measurement.

10. The processing system of claim 9, wherein the receiver module is configured to receive a second resulting signal with a second receiver electrode, and wherein the first receiver electrode and the second receiver electrode are proximate to regions of the transmitter electrode that correspond to the substantially discrete voltage values.

11. The processing system of claim 9, wherein the substantially discrete voltage values monotonically increase from the first end of the transmitter electrode to the second end of the transmitter electrode.

12. The processing system of claim 9, wherein the resistance of the transmitter electrode increases between regions of the transmitter electrode that correspond to the substantially discrete voltage values.

13. The processing system of claim 9, wherein the transmitter electrode comprises a contiguous resistive material.

14. The processing system of claim 9, wherein the positional information determined by the determination circuitry corresponds to at least one of zero-dimensional information and one-dimensional information for the input object.

15. The processing system of claim 9, wherein:
the transmitter module is further configured to drive the second end of the transmitter electrode such that the transmitter electrode exhibits a second voltage gradient extending from the second end of the transmitter electrode toward the first end of the transmitter electrode, wherein the second voltage gradient comprises a second set of substantially discrete voltage values, and wherein the first voltage gradient and the second voltage gradient are non-proportional; and
the receiver module is further configured to receive a second resulting signal with the first receiver electrode when the transmitter electrode exhibits the second voltage gradient.

16. A capacitive sensor device comprising:
a transmitter electrode;
a plurality of receiver electrodes, wherein each receiver electrode of the plurality of receiver electrodes is adjacent to a corresponding discrete region of the transmitter electrode, and further wherein each discrete region comprises a substantially discrete voltage value; and
a processing system communicatively coupled to the transmitter electrode and the plurality of receiver electrodes, the processing system configured to:
drive a first end of the transmitter electrode such that the transmitter electrode exhibits a first voltage gradient extending from the first end of the transmitter electrode toward a second end of the transmitter electrode;
receive a first resulting signal with a first receiver electrode of the plurality of receiver electrodes;
compute a first measurement of a change in capacitive coupling between the transmitter electrode and the first receiver electrode based on the first resulting signal; and
determine a button response for an input object based on the first measurement.

17. The capacitive sensor device of claim 16, wherein the first voltage gradient comprises a set of substantially discrete voltage values, each corresponding to a region of the discrete regions of the transmitter electrode and associated with a respective button response of the input object, and wherein the substantially discrete voltage values monotonically increase from the first end of the transmitter electrode to the second end of the transmitter electrode.

18. The capacitive sensor device of claim 16, wherein the processing system is further configured to drive the second end of the transmitter electrode such that the transmitter electrode exhibits a second voltage gradient extending from the second end of the transmitter electrode toward the first end of the transmitter electrode, wherein the first voltage gradient and the second voltage gradient are non-proportional.

19. The capacitive sensor device of claim 18, wherein the processing system is further configured to receive a second resulting signal with the first receiver electrode when the transmitter electrode exhibits the second voltage gradient.

20. The capacitive sensor device of claim 16, wherein the transmitter electrode is disposed on a first layer of a substrate, and the first receiver electrode is disposed on a second layer of the substrate.

* * * * *